United States Patent
Brekke et al.

(10) Patent No.: US 8,199,798 B2
(45) Date of Patent: Jun. 12, 2012

(54) METHOD AND MODEM FOR SUBSEA POWER LINE COMMUNICATION

(75) Inventors: Endre Brekke, Trondheim (NO); Vegard Horten, Rasta (NO); Vidar Steigen, Nittedal (NO)

(73) Assignee: Siemens Aktiengesellschaft, Munich (DE)

( * ) Notice: Subject to any disclaimer, the term of this patent is extended or adjusted under 35 U.S.C. 154(b) by 685 days.

(21) Appl. No.: 12/374,860

(22) PCT Filed: Jul. 24, 2006

(86) PCT No.: PCT/EP2006/007268
§ 371 (c)(1),
(2), (4) Date: Jan. 23, 2009

(87) PCT Pub. No.: WO2008/011889
PCT Pub. Date: Jan. 31, 2008

(65) Prior Publication Data
US 2010/0284453 A1    Nov. 11, 2010

(51) Int. Cl.
*H04B 1/38* (2006.01)
(52) U.S. Cl. ............ 375/222; 375/220; 375/260
(58) Field of Classification Search ......... 375/260, 375/219, 220, 222; 370/208–210
See application file for complete search history.

(56) References Cited

U.S. PATENT DOCUMENTS

| | | | |
|---|---|---|---|
| 5,010,529 A | 4/1991 | Maynus | 367/137 |
| 5,724,234 A | 3/1998 | Phelps | 361/816 |
| 5,883,791 A | 3/1999 | Deguchi | 361/818 |
| 6,272,072 B1 * | 8/2001 | Wulich et al. | 367/124 |
| 6,532,192 B1 * | 3/2003 | Reid | 367/127 |
| 7,259,969 B2 | 8/2007 | Zarganis et al. | 361/800 |
| 2004/0008957 A1 * | 1/2004 | Sakuyama | 385/123 |
| 2005/0243983 A1 | 11/2005 | Causier | 379/93.01 |
| 2006/0139833 A1 * | 6/2006 | Ranta et al. | 361/113 |
| 2008/0010488 A1 * | 1/2008 | Riggsby | 714/4 |
| 2009/0097581 A1 * | 4/2009 | McCallister et al. | 375/260 |

FOREIGN PATENT DOCUMENTS

| | | |
|---|---|---|
| CN | 1251967 A | 5/2000 |
| EP | 0975097 A2 | 7/1999 |
| GB | 2355167 A | 4/2001 |

(Continued)

OTHER PUBLICATIONS

PCT International Search Report and Written Opinion, PCT/EP2006/007269, 10 pages, Jun. 27, 2007.
PCT Notification of Transmittal of the International Preliminary Report on Patentability, PCT/EP2006/007268, 9 pages, Nov. 4, 2008.
PCT International Search Report and Written Opinion, PCT/EP2006/007268, 9 pages, Sep. 14, 2006.

(Continued)

*Primary Examiner* — Emmanuel Bayard
(74) *Attorney, Agent, or Firm* — King & Spalding L.L.P.

(57) ABSTRACT

A method for communicating binary data via an electric signal of a subsea power line includes establishing a point-to-point connection between a subsea electronic unit and a topside electronic unit for transmitting binary data via the electric signal of the subsea power line; the subsea electronic unit modulating binary data onto said electric signal using orthogonal frequency division multiplexing (OFDM), using 10-200 individual carrier bands in a selected radio frequency range; communicating the OFDM-modulated binary data via the subsea power line to the topside electronic unit; and the topside electronic unit demodulating the OFDM-modulated binary data, including passing the electric signal through a low-pass filter and passing said radio frequency with the modulated binary data through a band-pass filter.

15 Claims, 8 Drawing Sheets

FOREIGN PATENT DOCUMENTS

| | | |
|---|---|---|
| GB | 2355595 A | 4/2001 |
| GB | 2352376 B | 4/2004 |
| RU | 2178951 C1 | 1/2002 |
| RU | 2269869 C2 | 2/2006 |
| WO | 9712505 | 4/1997 |
| WO | 2008/011889 A1 | 1/2008 |
| WO | 2008/011891 A1 | 1/2008 |

OTHER PUBLICATIONS

PCT International Search Report and Written Opinion, PCT/EP2006/007270, 9 pages, Apr. 11, 2007.

PCT Notification of Transmittal of the International Preliminary Report on Patentability, PCT/EP2006/007270, 6 pages, Nov. 3, 2008.

* cited by examiner

METHOD AND MODEM FOR SUBSEA POWER LINE COMMUNICATION

CROSS-REFERENCE TO RELATED APPLICATIONS

This application is a U.S. National Stage Application of International Application No. PCT/EP2006/007268 filed Jul. 24, 2006, which designates the United States of America. The contents of which are hereby incorporated by reference in their entirety.

TECHNICAL FIELD

The invention relates to a method and a modem for subsea power line communication, i.e. for transmitting binary data via an electric signal of a subsea power line.

BACKGROUND

Subsea power line communication is a special form of underwater communication. It is preferably used in exploring and exploiting gas and oil fields located at the seabed. Subsea communication is used, for example, for transmitting various data between topside control sites and subsea wellheads. Gas and oil fields that are explored or exploited using electronic communication to the wellheads or to other electronic equipment are sometimes called "electronic fields" (e-fields).

In prior art, different techniques for subsea communication have been described. On the one hand, there are wired electric or optical connections, on the other hand there are wireless connections. The wired connections can be subdivided into a first group providing communication lines for electronic or optical connections separate from electric power lines, and a second group utilising power lines for electronic communications. In the latter case, advantageously no separate communication lines are needed.

For example, in US 2005/0243983 A1, a modem for receiving and transmitting data from and to a conductor is described. It comprises an output drive for transmitting data to the conductor, a receiver for receiving data from the conductor and impedance matching means for matching an impedance of a receiver input with an impedance of the conductor. A gain of the output drive, a receiver gain and the impedance of the receiver input are adjustable at this modem.

All known modems for subsea power line communication use some kind of frequency shift keying modulation technique, allowing for bit rates of up to 19200 bit/s and operational ranges of up to about 100 km. For this purpose, the known modems make use of diplexers comprising a low-pass filter for the electric signal and a high pass filter for the modulated binary data, filtering out frequencies above and below 100 kHz, respectively.

SUMMARY

According to various embodiments, a method and a modem for subsea power line communication can be specified by which communication is possible at significantly higher bit rates and larger operational ranges.

According to an embodiment, in a method for communicating binary data via an electric signal of a subsea power line, the binary data can be modulated onto the electric signal using orthogonal frequency division multiplexing.

According to a further embodiment, a frequency range within an interval from 2 kHz to 400 kHz can be used for a radio frequency comprising the modulated binary data. According to a further embodiment, the electric signal can be passed through a low-pass filter, and the radio frequency with the modulated binary data may be passed through a band-pass filter. According to a further embodiment, 10 to 200 individual carrier bands may be used within the frequency range. According to a further embodiment, a gain of at least one of the individual carrier bands may be dynamically adjusted. According to a further embodiment, in a training sequence with a connected partner modem, at least one of the carrier bands may be classified to be usable or unusable depending on a predefinable threshold. According to a further embodiment, those of the carrier bands that are classified to be unusable may be masked out. According to a further embodiment, diagnostic data may be modulated onto the electric signal in spare carrier bands, in parallel with the binary data. According to a further embodiment, the binary data may be obtained from or sent to an electronic unit via an Ethernet connection. According to a further embodiment, a receive mode or a transmit mode may be negotiated via the power line.

According to another embodiment, a modem for communicating binary data via an electric signal of a subsea power line, may use orthogonal frequency division multiplexing for modulating the binary data onto the electric signal.

According to a further embodiment, the modem may comprise a diplexer that comprises a low-pass filter for the electric signal and a band-pass filter for a radio frequency comprising the modulated binary data. According to a further embodiment, the modem may use a frequency range within an interval from 2 kHz to 400 kHz for the radio frequency with the modulated binary data. According to a further embodiment, the modem may use 10 to 250 individual carrier bands within the frequency range. According to a further embodiment, the modem may dynamically adjust a gain of at least one of the individual carrier bands. According to a further embodiment, the modem may perform a training sequence with a connected partner modem, wherein at least one of the carrier bands is classified to be usable or unusable depending on a predefinable threshold. According to a further embodiment, the modem may mask out those of the carrier bands that are classified to be unusable. According to a further embodiment, the modem may modulate diagnostic data onto the electric signal in spare carrier bands, in parallel with the binary data. According to a further embodiment, the modem may provide at least one Ethernet connection. According to a further embodiment, the modem may comprise a reduced instruction set central processing unit for providing the Ethernet connection.

BRIEF DESCRIPTION OF THE DRAWINGS

In the following, the invention is described in further detail with several drawings.

In all drawings, corresponding parts are denoted by identical reference signs.

DETAILED DESCRIPTION

Figure 1:
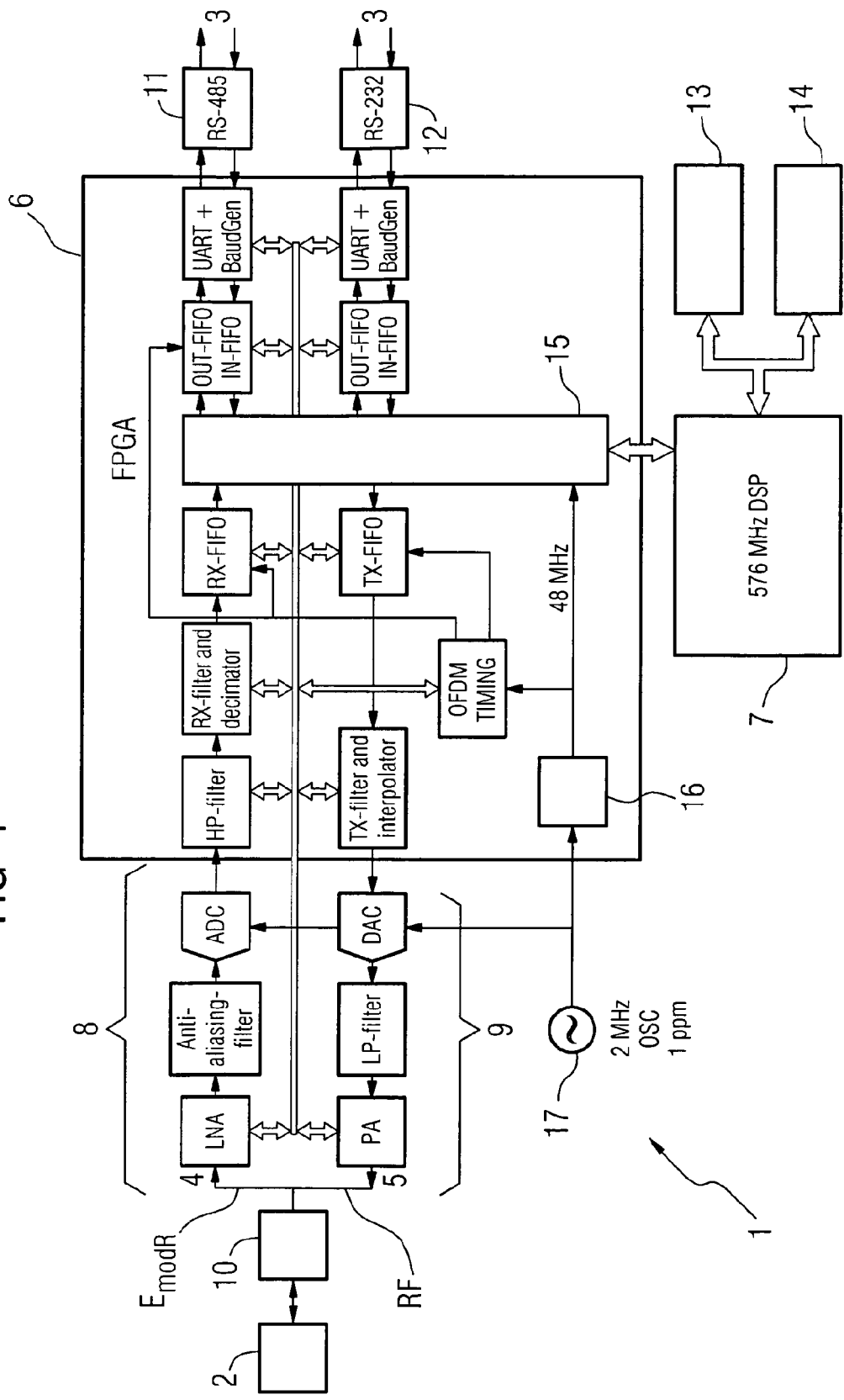
FIG. 1 shows a block diagram of a modem according to an embodiment.

According to various embodiments, it is understood that when ever a statement relates to modulation it can alternatively or additionally be related to demodulation in a corresponding way.

According to various embodiments, it is proposed to modulate binary data onto the electric signal of a subsea power line using orthogonal frequency division multiplexing (OFDM), in particular in an appropriate modem. According to an embodiment, the OFDM is preferably performed in both of two communicating modems, one at the seabed and one at the topside. This way, a point-to-point connection at a high bit rate of up to 3 Mbit/s can be provided, for example, between a subsea electronic unit and a topside control site.

With OFDM, which itself is known from television broadcasting, the transmitting modem sends on multiple different orthogonal frequencies called carrier bands or channels. Two carrier bands are said to be orthogonal if they are independent from each other regarding their relative phase relation-hip. The binary data is modulated onto the electric signal in the form of so-called OFDM symbols.

Using OFDM for subsea power line communication results in several advantages. The different carrier bands can be close to each other in terms of frequency, thus enabling high spectrum efficiency, allowing for a high total bit rate. Besides, OFDM allows for easily filtering out noise. If a certain frequency range encounters interference, the respective carrier bands can be operated a slower bit rate or can even be disabled. This way, a high operational range up to 200 km can be achieved. Additionally, by assigning appropriate numbers of carrier bands to upstream and downstream transmission, the respective bit rates can be adjusted as required.

In preferred embodiments a frequency range within an interval from 2 kHz to 400 kHz is used for OFDM, i.e. said modulated binary data. It is possible to use a frequency range having the same width as this interval or narrower than this interval, e.g. 10 kHz to 400 kHz. This embodiment provides a wide frequency band for OFDM, hence enabling a larger number of carrier bands and thus high bit rates. This is in particular achieved by using frequencies below 100 kHz, in contrast to prior art. Thus, broadband transmission is possible, resulting in higher bit rates. The upper limit of 400 kHz reduces high-frequency noise caused by switched power supplies, and their harmonics, as well as noise picked up from topside sources. Besides, the attenuation of subsea cables is high in frequencies above 400 kHz.

Advantageously, the electric signal is passed through a low-pass filter, and the modulated binary data is passed through a band-pass filter. The filters are preferably comprised in a diplexer unit of the modem. The band-pass filter allows passing through frequencies from 2 kHz to 400 kHz for a best achievable signal. The low-pass filter allows cutting out the disturbance from the low frequency noise from topside and subsea power supplies before the modem signal is superimposed on the subsea power line. Preferably, the low-pass filter starts to bend from 2 kHz and down to 0 Hz.

In a preferred embodiment, 10 to 200 individual carrier bands are used within said frequency range. If many carrier bands are used, each carrier band can operate at a slow bit rate. Thus, the duration of the transmitted OFDM symbols can be relatively long, reducing the sensitivity of the transmission to impulsive noise. The operation range can be increased thereby. Because of the large number of carrier bands, a high total bit rate can be achieved nonetheless.

Preferably, a gain of at least one of said individual carrier bands is dynamically adjusted. This way, even weak carrier bands with high noise can be used for transmission.

For minimal transmission errors at least one of said carrier bands is classified to be usable or unusable depending on a predefinable threshold in a training sequence with a connected partner modem.

Preferably, those of said carrier bands that are classified to be unusable are masked out.

In an advantageous embodiment, diagnostic data is modulated onto said electric signal in spare carrier bands, in parallel with said binary data. This enables diagnostics during normal operation of the modem without restricting the available bandwidth of the actual binary payload data.

In a sophisticated embodiment, said binary data is obtained from or sent to an electronic unit via an Ethernet connection. A corresponding modem provides at least one Ethernet connection. This enables high bit rates for external connections. Preferably, such a modem comprises a reduced instruction set central processing unit for providing said Ethernet connection. In such a sophisticated embodiment, a receive mode or a transmit mode is preferably negotiated via said power line. This enables to provide full-duplex communication between two modems by alternating the transmission direction as required.

An advantage obtained may be in particular, that the possible transmission bit rate and the possible operational range are significantly improved in comparison to prior art modems.

FIG. 1 shows an exemplary block diagram of a modem 1 for communication via a subsea power line 2 to electronic units 3, e.g. a control subsea e-field. The power line 2 is also called the umbilical.

The modem 1 comprises a receiving path 4 and a transmitting 5 path 5 for data communication between the power line 2 and the electronic units 3.

In more detail, the modem 1 comprises a field programmable gate array 6 (FPGA), an digital signal processor 7 (DSP), an analogue-to-digital processing line 8 and a digital-to-analogue processing line 9. Both processing lines 8 and 9 are connected with a diplexer 10 via a differential interface (not shown) and with the field programmable gate array 6. By the diplexer 10, the modem 1 is connectable to the subsea power line 2.

Furthermore, the field programmable gate array 6 provides two independent bidirectional external serial interfaces 11 and 12, e.g. one RS-485 connection 11 connectable with a so-called PROFIBUS for binary payload data, and one RS-232 connection 12 for diagnostic data.

On the one hand, the field programmable gate array 6 creates an OFDM-modulated signal RF from the binary data obtained from the RS-485 connection 11 and, if required, from diagnostic data obtained from the RS-232 connection 12 on the transmitting path 5. These data are modulated as the OFDM-modulated signal RF onto the electric signal EmodRF of the power line 2. On the other hand, the field programmable gate array 6 demodulates an OFDM-modulated signal EmodRF obtained from the power line 2 via the diplexer 10 into binary payload data on the receiving path 4, and, if necessary, into diagnostic data that are output to the RS-485 connection 11 and the RS-232 connection 12, respectively.

As computation costs are high for orthogonal frequency division multiplexing the field programmable gate array 6 utilizes a digital signal processor 7 for both modulation and demodulation. Appropriate digital signal processors 7 with a program flash 13 and a data memory 14 are commercially available. The digital signal processor 7 is connected via an interface 15 comprising programming registers with the field programmable gate array 6. The interface 15 is synchronized with 48 MHz by a clock phase-locked loop 16 with a reference frequency, e.g. 2 MHz, of a voltage controlled oscillator 17.

For OFDM modulation and demodulation, the modem 1 uses, for example, 195 individual carrier bands, i.e. channels, with a frequency range of 10 kHz to 400 kHz. Other frequency ranges within an interval from 2 kHz to 400 kHz are possible. In particular, an operator may assign or block out specific carrier bands as required. For each carrier band, one of the known modulation techniques QPSK, 16-QAM or 64-QAM can be used. The modem 1 automatically selects the optimum choice for the particular modulation. However, an operator may set a maximum constellation. The modem 1 measures a signal-to-noise ratio (SNR) for each carrier band and allocates power in order to maximise transmission rate. Thereby, it provides a bit rate of up to 3 Mbit/s and an operational range of up to 200 km. The RS-232 connection 12 has a maximum bit rate of 115200 bit/s.

The diplexer 10 is able to connect a radio frequency modem 1 to both ends of the power line 2 in such way that two modems 1 are able to communicate with each other while the power line cable is also used for power distribution. For this purpose, the diplexer 10 maintains the signal impedance of the electrical signal E of the power line 2. The diplexer 10, part of the OFDM modem 1, is designed for point-to-point connections between topside and subsea control systems. It provides a bandwidth similar to or larger than its upstream circuits 6 to 9 to transmit the modulated signal RF without distortion.

Figure 2:
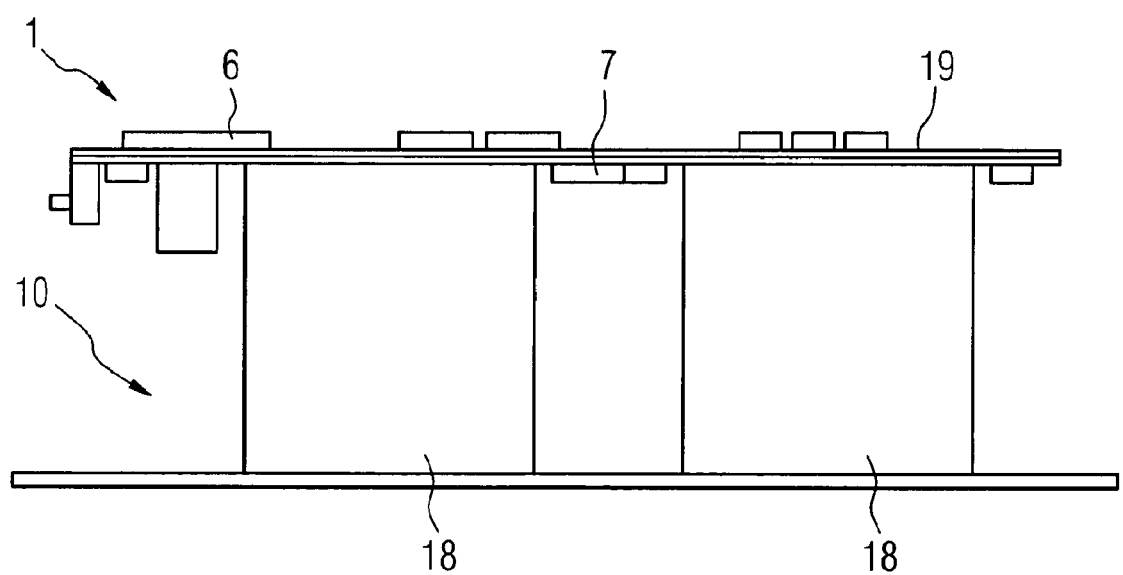
FIG. 2 shows the modem and its diplexer in a schematic side view.

The diplexer 10 is compactly arranged in the modem 1. FIG. 2 schematically shows how the components of the diplexer 10, e.g., two transformers 18, alternate with the components of a printed circuit board 19 (shortly called PCB), e.g., the field programmable gate array 6 and the digital signal processor 7, without touching them. The two transformers 18 are very compact and stand on the printed circuit board 19 downside; the IC components, e.g. the field programmable gate array 6 and the digital signal processor 7, stand downside and/or upside on the printed circuit board 19. The components are mounted on both sides of a e.g. single six-layer printed circuit board 19. Thereby, the whole modem 1 is very compact, as its physical size must be minimal for subsea control system applications.

Figure 3:
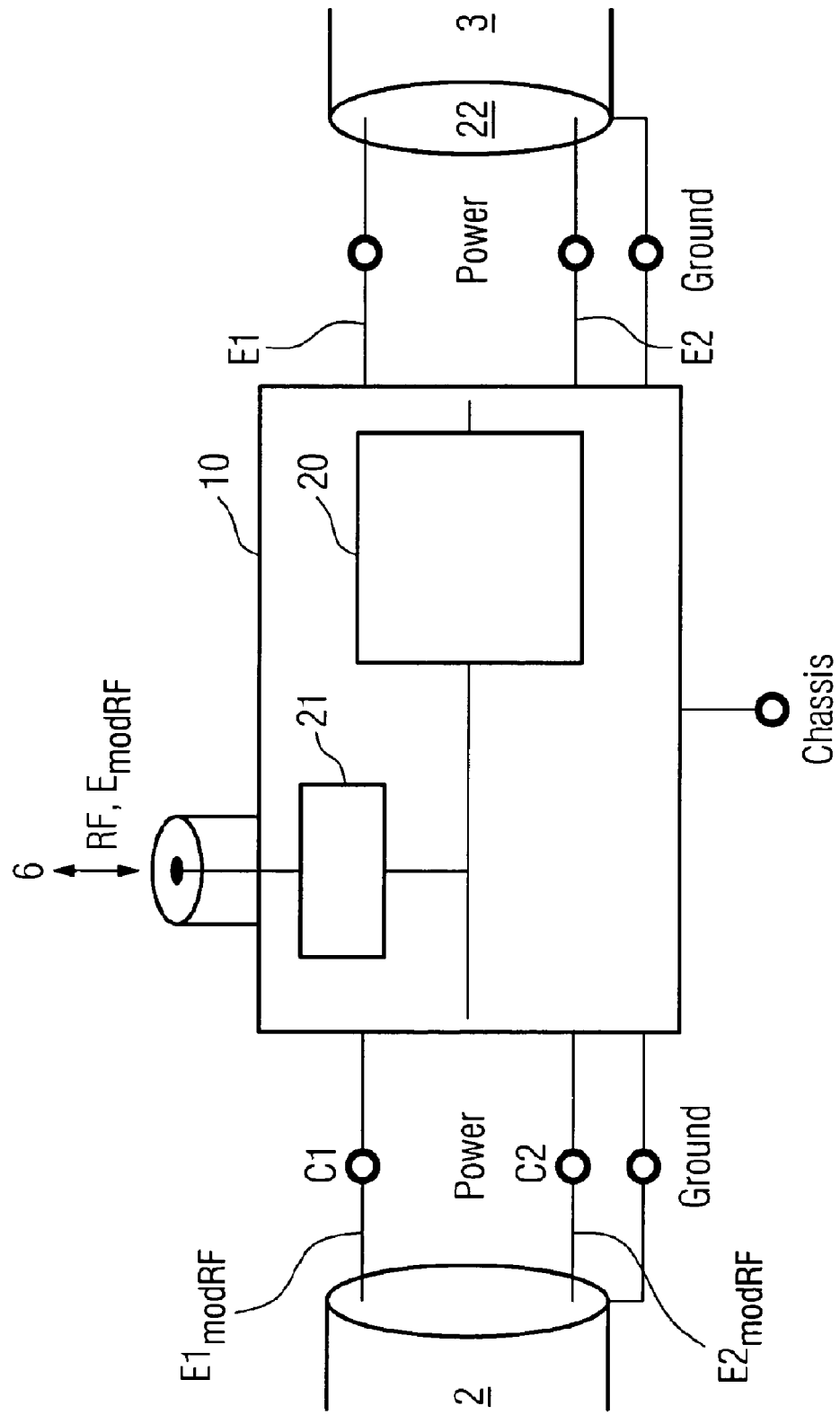
FIG. 3 shows a block diagram of the diplexer.

FIG. 3 shows a block diagram of the diplexer 10, comprising a low-pass filter 20 for the electric signal E1, E2 and a band-pass filter 21 for the modulated binary data. The diplexer 10 is uniform for both subsea and topside modems 1.

In case of a topside diplexer 10, a power supply 22 of the topside electronic units 3 with electric power signals E1 and E2 is connected at the right end of the block diagram. The radio frequency signal RF is input from the field programmable gate array 6, with the so-called OFDM circuits 6 to 9, i.e. the modulated binary data. The OFDM modulated electric power signals $E1_{modRF}$, $E2_{modRF}$ are then conducted towards subsea power lines 2 on the left side of the block diagram.

A diplexer 10 for subsea use receives the OFDM modulated electric power signal $E_{modRF}$ at the left side of the block diagram. The radio frequency signal RF, representing the modulated binary data, is extracted by the band-pass filter 21 which is connected to the OFDM circuits of the field programmable gate array 6. The subsea power supply 22 is connected at the right side of the block diagram.

The low-pass filter 20 filters noise from the power supplies 22 from being fed to the communication part of the subsea power line 2. The band-pass filter 21 allows for frequencies from 10 kHz to 400 kHz to be passed through.

Figure 4:
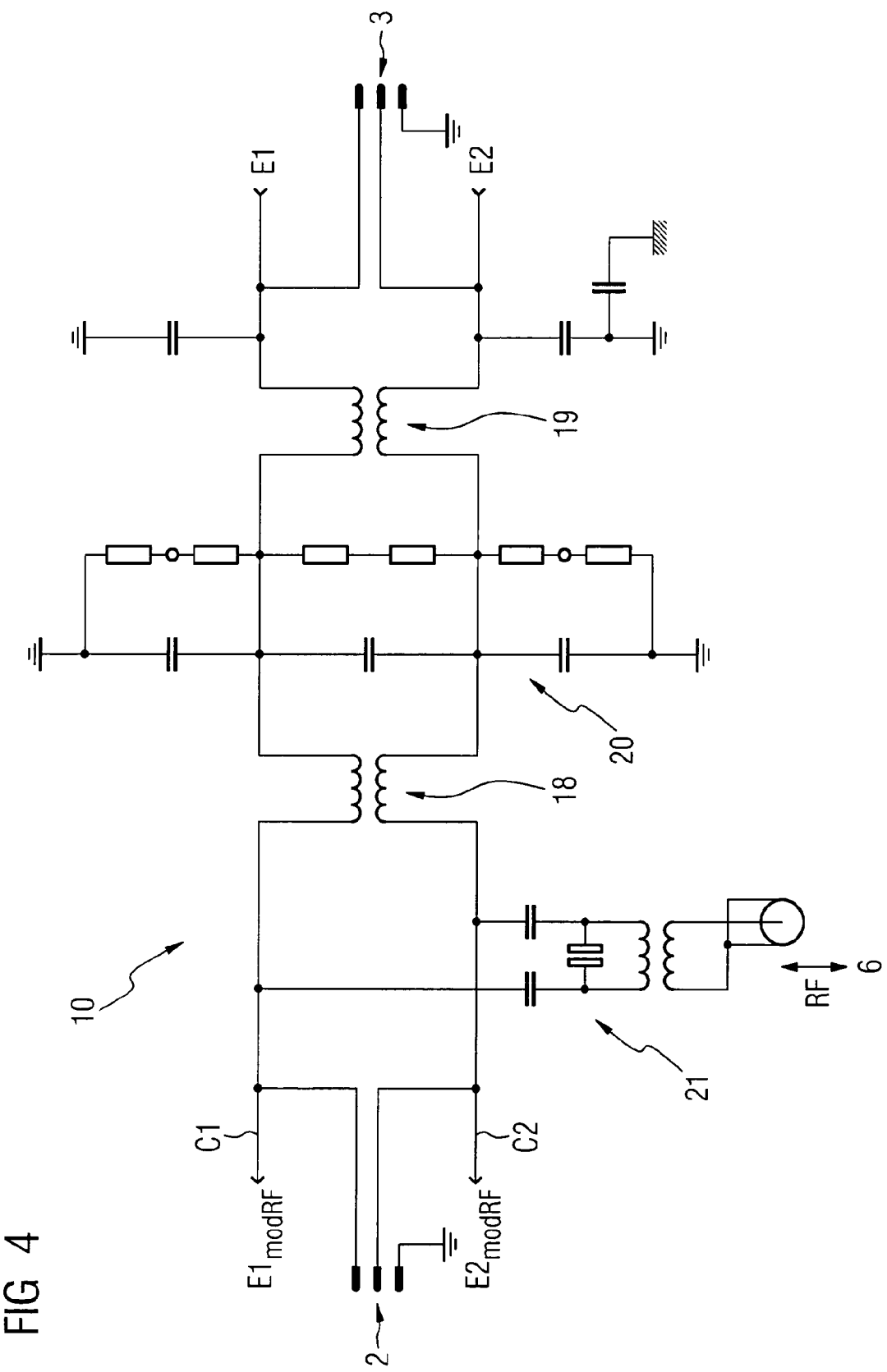
FIG. 4 shows a circuit diagram of the diplexer.

In FIG. 4, the circuit diagram of the diplexer 10 is depicted. In comparison to FIG. 3, the circuit of the diplexer 10 is provided on the left side with the electric power signal $E_{modRF1}$, $E_{modRF2}$ combined with the modulated binary data signal. The radio frequency signal RF is output to the OFDM circuits of the field programmable gate array 6 at the bottom. A power supply 22 is connected at the right side for low-pass frequency filtering.

The power side filtering provides a differential mode attenuation of larger than 45 db in the range from 2 kHz to 5 kHz and larger than 70 dB in the range from 5 kHz to 500 kHz. The common mode attenuation between 2 kHz and 500 kHz is larger than 80 dB.

The signal side filtering provides a differential mode attenuation of less than 2 db in the range from 2 kHz to 500 kHz. The common mode attenuation between 2 kHz and 500 kHz is larger than 60 dB. The group delay is less than 75 ps for 2 kHz to 5 kHz, and less than 25 μs for 5 kHz to 500 kHz.

Figure 5:
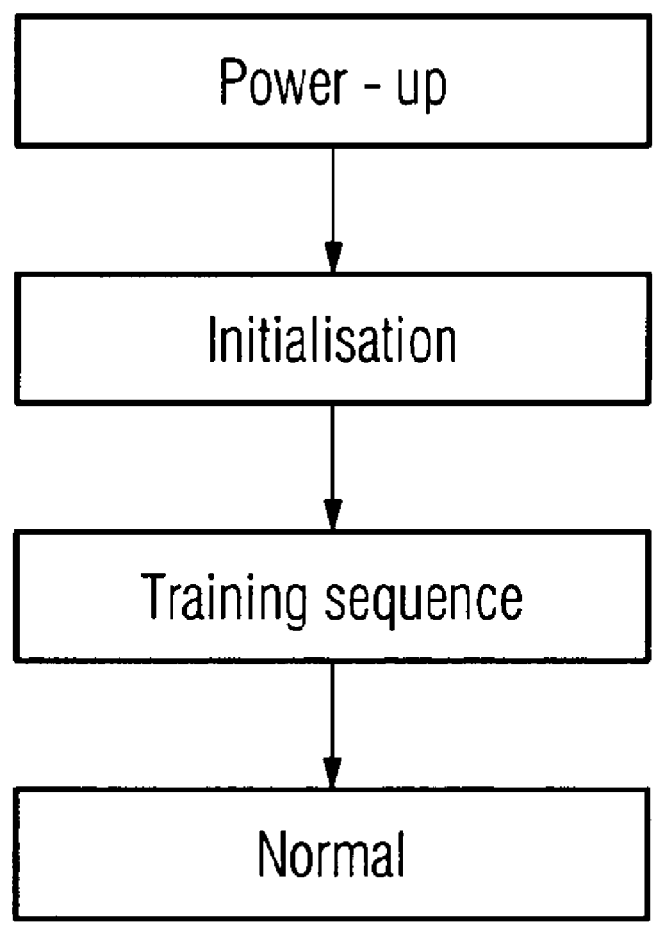
FIG. 5 shows a flow diagram of modem stages after powering up the modem.

In FIG. 5, the different stages are shown through which the modem 1 passes after power is provided to it. There are four stages: Power-up, Initialisation, Training sequence, and Normal operation. During the Power-up stage, persistent parameters in the digital signal processor 7 are set and light emitting diodes (LED, not shown) showing information externally are switched appropriately. The persistent parameters include e.g. the modem type, the modem serial number and hardware revision, an OFDM guard interval, the PROFIBUS transmission rate, the available output power, reception (Rx) gain, Rx attenuation, signal-to-noise ratio margin, a downlink channel pattern, and an uplink channel pattern.

Figure 6:
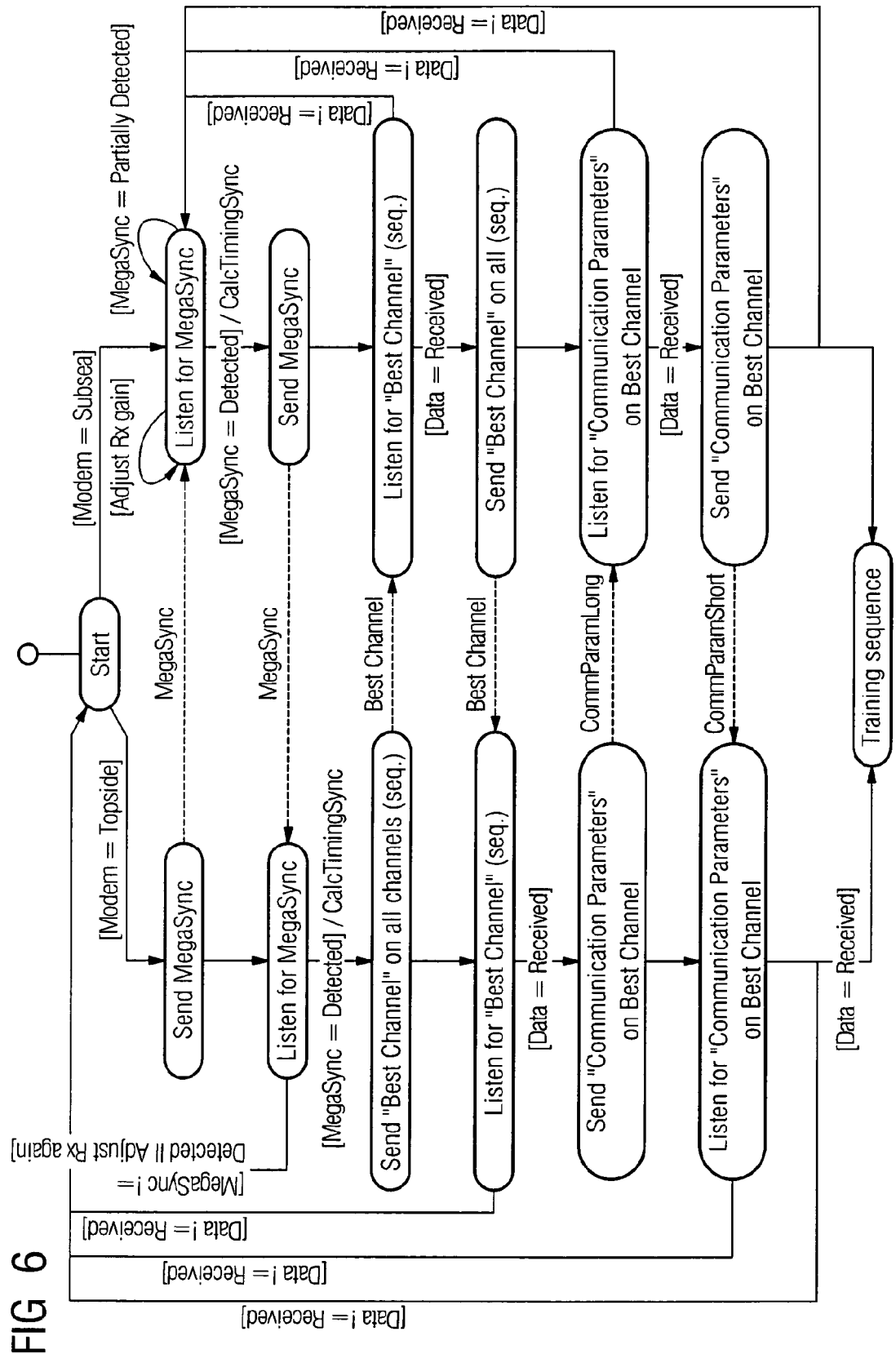
FIG. 6 shows a flow diagram of the Initialisation stage.

After the Power-up stage, the modem 1 automatically starts the Initialisation stage. The Initialisation comprises different states that are shown in FIG. 6. During the Initialisation stage, the modem 1 never uses more than one channel at a given time instant. In the "Megasync" and "BestChannel" states, the modem 1 transmits sequentially from the lowest active channel to the highest active channel. In the "CommParam" state the modem 1 transmits on one channel only.

In the "Megasync" state the modem 1 sends a definable signal sequence sequentially on each of the active channels. The remote modem (not shown) receives these "Megasync" signals and performs the following steps. If the measured signal level is low, the remote modem 1 automatically increases Rx gain as much as possible. A signal level of approximately 90 dB is tolerated prior to clipping. If the signal level is too high (clipping occurs), the remote modem 1 reduces Rx gain until clipping is insignificant. The total Rx gain is split between two parts, Rx gain and Rx attenuation. Rx gain may be adjusted from 0 to 24 dB. Rx attenuation may be enabled, resulting in an 11 dB attenuation, or disabled, resulting in 0 dB attenuation. Hence, a total gain of 24+11=35 dB may be achieved. By default, the gain is set to maximum. Subsequently, the remote modem 1 measures values of the signal-to-noise ratio for each channel. Then, the channel having the highest signal-to-noise ratio value is assigned to be the "Best Channel".

The topside modem will always start "Megasync", while the subsea modem always enters a "Megasync" receive state. If, after two attempts, the topside modem has not received any "Megasync" from the subsea modem, an appropriate LED is illuminated to signal the umbilical break. This LED is cleared as soon as a "Megasync" is received from the subsea modem. An Initialisation LED is illuminated as soon as the modem enters the "Megasync" state.

In the "BestChannel" state, the modem 1 sends information about the best channel sequentially on each of the active channels. A CRC8 checksum code is applied to the "BestChannel" message.

In the "CommParam" state, the modem 1 transmits information about communication parameters to be applied during Training sequence and Normal operation stages. Which parameters are sent depends on the transmission direction and the respective channel used. They are described in the following table:

|  | Topside modem to subsea modem | Subsea modem to topside modem |
| --- | --- | --- |
| Per channel | Uplink power<br>Uplink modulation<br>Downlink channel mask<br>Uplink channel mask | Downlink power<br>Downlink modulation<br>Downlink SNR |
| Overall | SNR margin<br>PROFIBUS UART rate |  |

As can be seen, the subsea modem performs power allocation for the topside modem, while topside modem performs power allocation for the subsea modem. All available output power is then allocated. A CRC32 code is applied to the "CommParam" message. The "CommParam" message is transmitted on the "Best Channel" only. When completing the "CommParam" state, the initialisation LED is cleared.

When Initialisation is completed, the modem 1 and the remote modem enter the Training sequence stage. A "Training Sequence" is transmitted in order to obtain an initial channel estimate and to test the actual power allocation and modulation constellations. During the Training sequence stage, the modem 1 uses the communication parameters decided during the Initialisation stage. Hence, the modems will occupy the frequency range decided during Initialisation.

After successfully completing the Training sequence stage, both modems enter the Normal operation stage, i.e., they start to transfer binary payload data obtained from their PROFIBUS RS-485 connections 11.

The modem 1 has embedded logic in order to minimise latency. The basic of this logic is that the modem 1 may start modulating and transmitting a PROFIBUS telegram onto the umbilical prior to receiving the entire telegram from the PROFIBUS host connected at the RS-485 connection 11. Similarly, at the receiving end, the remote modem may start transmitting a PROFIBUS telegram to its PROFIBUS host prior to receiving the entire PROFIBUS telegram from the umbilical. The calculation on when to start transmitting a PROFIBUS telegram is based on the PROFIBUS bit rate, which is definable as a parameter of the modem 1, and the PROFIBUS telegram length, which is given by the first byte in the respective telegram.

An overall requirement for PROFIBUS transmission is that no inter-byte gap is allowed between consecutive bytes in a telegram. Hence, the modem 1 must ensure this requirement when calculating when to start transmitting PROFIBUS telegrams. The PROFIBUS slot time, which is configured on PROFIBUS equipment and thus part of the bus parameters, must be configured in order to provide for the extra latency added by the communicating modems. The modems shall be able to work with the minimum slot times given by the following table:

| PROFIBUS bit rate [kbit/s] | Minimum slot time |
| --- | --- |
| 9.6 | 220 |
| 19.2 | 250 |
| 93.75 | 800 |
| 187.5 | 1500 |
| 500 | 3800 |
| 1500 | 7000 |
| 3000 | 13000 |

The initial channel estimate performed in the Training sequence stage is regularly updated by means of receiving PROFIBUS data. The communicating modems basically require new data to be received approximately every 100 ms in order to maintain a correct channel estimate. If, for some reason, the period between two consecutive PROFIBUS telegrams exceeds 100 ms, the respective sending modem will transmit a timeout packet in order to maintain the channel estimate. This timeout packet may cause a PROFIBUS telegram to be corrupted; hence a PROFIBUS retransmission may occur. Due to the timeout packets, the modems are able to maintain the link even if no PROFIBUS data is applied.

Additionally, a control channel is implemented as a parallel channel to the PROFIBUS data channel via the umbilical. The purpose of the control channel is to transfer diagnostic data, i.e. parameters and messages, from the subsea modem to a diagnostics tool connected to the topside modem without affecting the bit rate of the binary payload data. For this purpose, the diagnostic data is modulated onto the electric signal of the power line in spare OFDM carrier bands, in parallel with said binary payload data. The control channel is established as soon as the modems enter the Normal operation stage.

The modem 1 may be forced into a sine wave output test mode. Then, the Normal operation stage is stopped, and the modem 1 is configured to output a sine wave on a particular channel. This is an easy mechanism to verify the functionality of the modem analogue circuitry. In order to enter sine wave output test mode, a corresponding "bRunSineTest" parameter is set to true, the desired output channel is through a "SineTest Channel" parameter between 0 and 194. The channel bandwidth is approximately 1.95 kHz, hence the approximate centre frequency of the output sine wave is "SineTestChannel"*1.95 kHz. Afterwards, the modem 1 is started.

Besides, the modem 1 may be forced into a Noise test mode. This means that the Normal operation mode is stopped, and the modem 1 is configured to a receive-only state. In this state the power amplifier is turned off. This is an easy mechanism to visualise the modem noise input. In order to enter noise test mode, a "bRunNoiseTest" parameter is set to true. Afterwards, the modem 1 is started.

Figure 7:
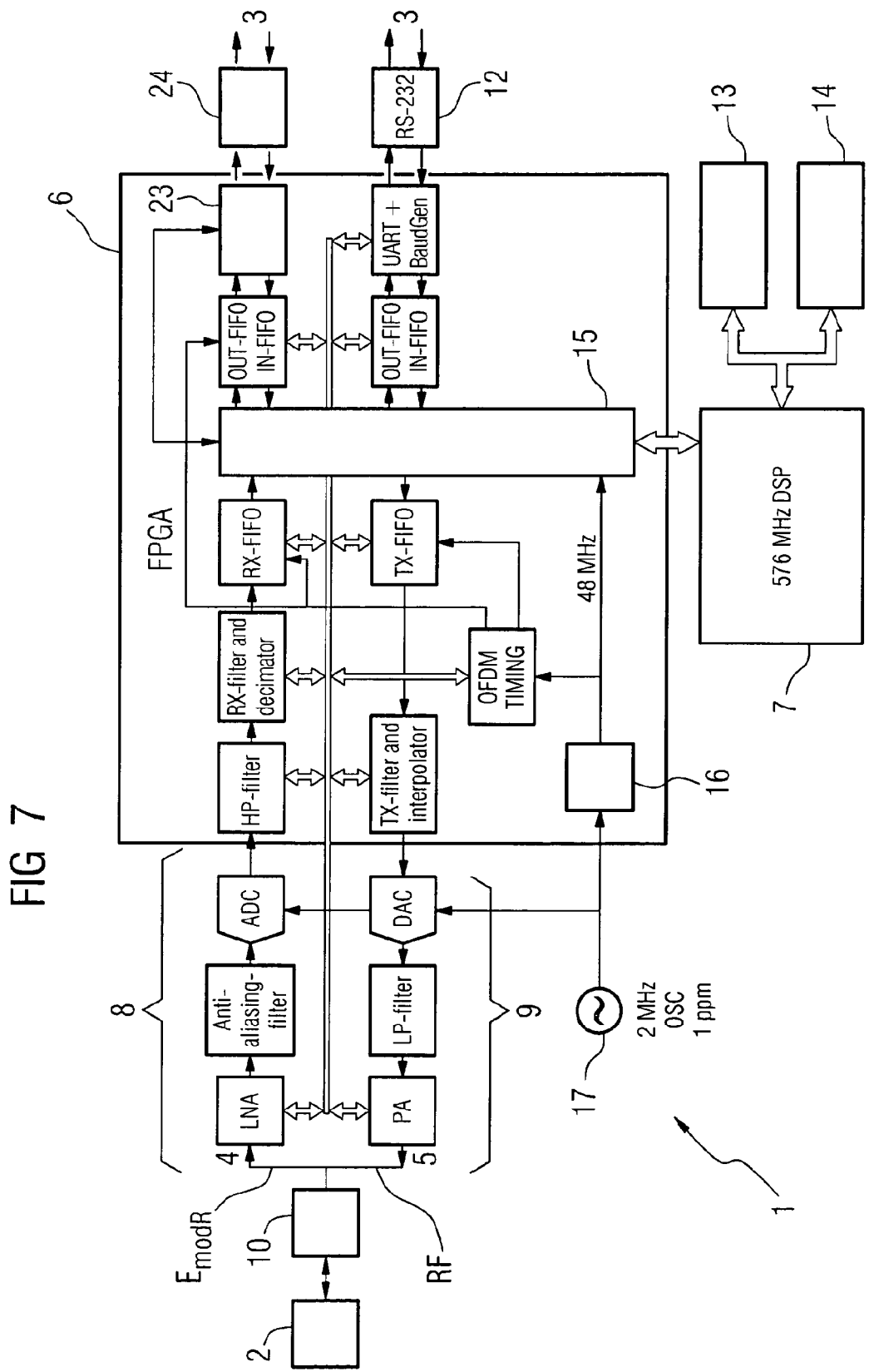
FIG. 7,8 show a block diagram of another modem providing Ethernet connectivity.

FIG. 7 shows a block diagram of another exemplary modem 1 that is configured similar to that of FIG. 1. Instead of a serial interface circuit for a RS-485 connection, the modem 1 comprises a reduced instruction set (RISC) central processing unit 23 with a built-in Ethernet controller (not shown) providing an external Ethernet connection 24 to an electronic unit 3. The reduced instruction set central processing unit 23 interfaces the digital signal processor 7 via the field programmable gate array 6.

The reduced instruction set central processing unit 23 either is in transmit mode or in receive mode. In receive mode the reduced instruction set central processing unit 23 reads Ethernet frames from the Ethernet controller and writes the frames to a buffer in the field programmable gate array 6. In transmit mode the reduced instruction set central processing unit 23 reads frames from the buffer of the field programmable gate array 6 and writes the frames to the respective Ethernet controller. If frames arise that are to be sent to the Ethernet controller while the reduced instruction set central processing unit 23 is in receive mode, i.e., is reading from the Ethernet controller, the reduced instruction set central processing unit 23 buffers the arising frames until the transmission direction is changed to transmit mode.

The transmission direction is negotiated by two connected modems 1 in such a way that both modems 1 at all times agree on transmission direction. This is called transmission direction scheduling. With a pair of connected modems 1 the following will always apply: One of the modems 1 will be in transmit mode and the other modem 1 will be in receive mode. If a modem 1 is in transmit mode it will stay in this mode as long as it has pending data to transmit or until a predefined parameterised timeslot has elapsed. When either of these two conditions apply the other modem 1 transmission direction will reverse. When one of the modems 1 enters transmit mode and has no pending data to transmit, the transmission direction will reverse after a short parameterised timeslot.

Figure 8:
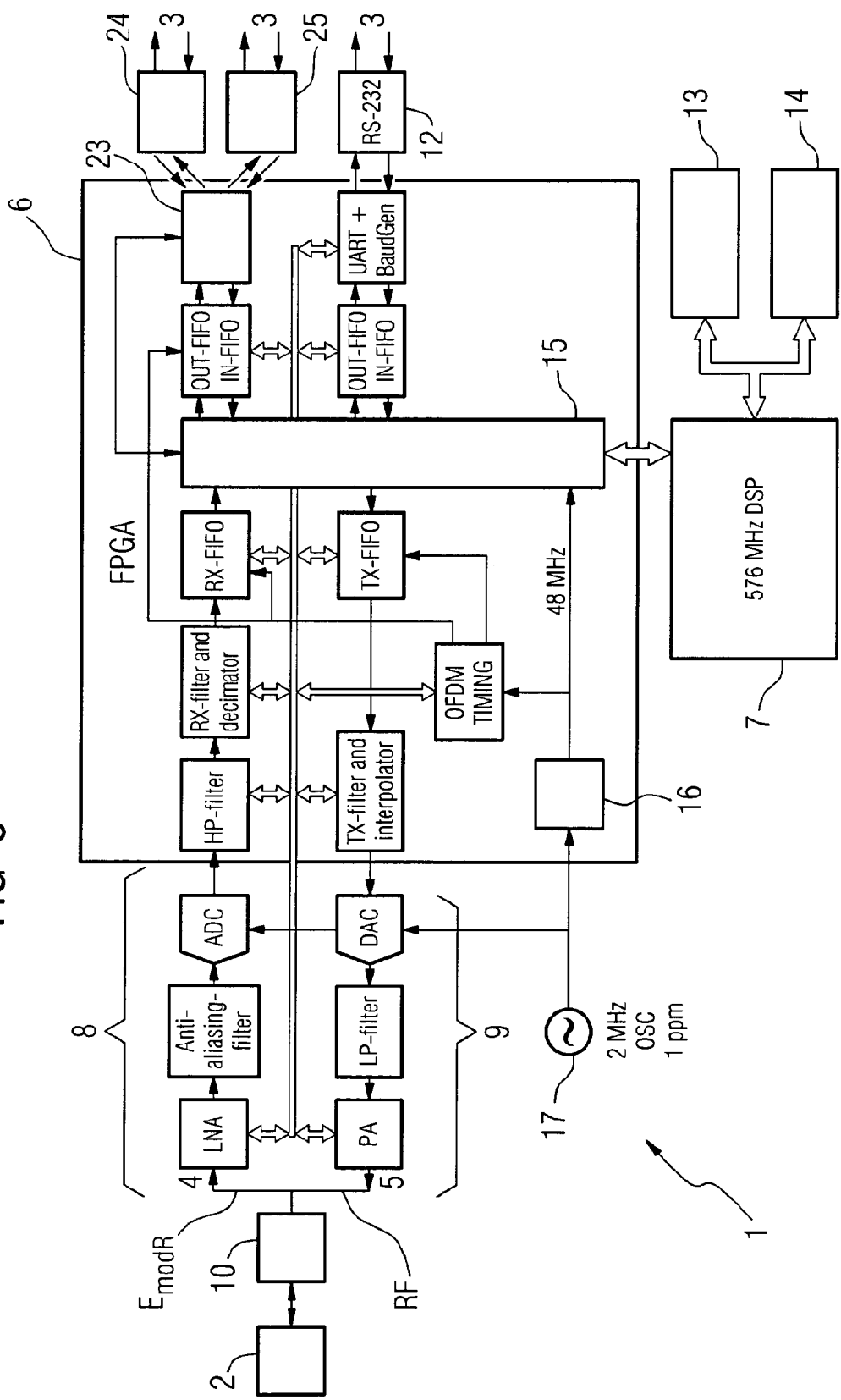

A pair of modems 1 connected by a power line 2 constitutes a half duplex communication link (not shown). With the above described transmission direction scheduling, the modems 1 will constitute a full duplex point-to-point communication link for Ethernet nodes on both sides of the communication link FIG. 8 shows a block diagram of another modem 1 that is configured similar to that of FIG. 7. However, the reduced instruction set central processing unit 23 has two built-in Ethernet controllers (not shown) providing two external Ethernet connections 24 to two different electronic units 3. For each of the Ethernet connections 24, a respective dual twisted pair cable is used. The two Ethernet connections 24 allow for two simultaneous point-to-point communication links over a single power line 2 connection. The communication via the Ethernet connections 2 can be performed using the transmission direction scheduling as described above for each Ethernet connection 24 separately. Alternatively, simple half-duplex transmission can be used.

What is claimed is:

1. A method for communicating binary data via an electric signal of a subsea power line, comprising:
    establishing a point-to-point connection between a subsea electronic unit and a topside electronic unit for transmitting binary data via the electric signal of the subsea power line,
    at one of the subsea electronic unit and the topside electronic unit, modulating binary data onto said electric signal using orthogonal frequency division multiplexing (OFDM), using 10-200 individual carrier bands in a selected radio frequency range,
    communicating the OFDM-modulated binary data via the subsea power line to the other one of the subsea electronic unit and the topside electronic unit, and
    at the other one of the subsea electronic unit and the topside electronic unit, demodulating the OFDM-modulated binary data, including passing the electric signal through a low-pass filter and passing said radio frequency with the modulated binary data through a band-pass filter.

2. The method according to claim 1, wherein a gain of at least one of said individual carrier bands is dynamically adjusted.

3. The method according to claim 1, wherein, in a training sequence with a connected partner modem, at least one of said carrier bands is classified to be usable or unusable depending on a predefinable threshold.

4. The method according to claim 3, wherein those of said carrier bands that are classified to be unusable are masked out.

5. The method according to claim 1, wherein diagnostic data is modulated onto said electric signal in spare carrier bands, in parallel with said binary data.

6. The method according to claim 1, wherein said binary data is obtained from or sent to an electronic unit via an Ethernet connection.

7. The method according to claim 6, wherein a receive mode or a transmit mode is negotiated via said power line.

8. A subsea modem for communicating binary data, said subsea modem being located in a subsea electronic unit and connected with a topside electronic unit via a subsea power line,
    said subsea modem operable to use orthogonal frequency division multiplexing (OFDM) for modulating said binary data onto an electric signal for communication to said topside electronic unit via said subsea power line, the IFM modulation using 10-200 individual carrier bands in a selected radio frequency range,
    said subsea modem comprising a diplexer for demodulating OFDM-modulated binary data received from said topside electronic unit via an electric signal carried by said subsea power line, said diplexer including a low-pass filter for said electric signal and a band-pass filter for a radio frequency comprising said OFDM-modulated binary data.

9. The subsea modem according to claim 8, being operable to dynamically adjust a gain of at least one of said individual carrier bands.

10. The subsea modem according to claim 8, being operable to perform a training sequence with a connected partner modem, wherein at least one of said carrier bands is classified to be usable or unusable depending on a predefinable threshold.

11. The subsea modem according to claim 10, being operable to mask out those of said carrier bands that are classified to be unusable.

12. The subsea modem according to claim 8, being operable to modulate diagnostic data onto said electric signal in spare carrier bands, in parallel with said binary data.

13. The subsea modem according to claim 8, being operable to provide at least one Ethernet connection.

14. The subsea modem according to claim 13, comprising a reduced instruction set central processing unit for providing said Ethernet connection.

15. A method for communicating binary data via an electric signal of a subsea power line, comprising:
    establishing a point-to-point connection between a subsea electronic unit and a topside electronic unit for transmitting binary data via the electric signal of the subsea power line,
    at one of the subsea electronic unit and the topside electronic unit, modulating binary data onto said electric signal using orthogonal frequency division multiplexing (OFDM), using 10-200 individual carrier bands in a selected radio frequency range, and modulating diagnostic data onto said electric signal in spare carrier bands, in parallel with said binary data, and
    communicating the OFDM-modulated binary data via the subsea power line to the other one of the subsea electronic unit and the topside electronic unit.

* * * * *